US006703916B2

(12) United States Patent
Charvet et al.

(10) Patent No.: US 6,703,916 B2
(45) Date of Patent: Mar. 9, 2004

(54) MICRO-DEVICE WITH THERMAL ACTUATOR

(75) Inventors: Pierre-Louis Charvet, St Martin le Vinoux (FR); Michel Dufour, Grenoble (FR)

(73) Assignee: Commissariat a L'Energie Atomique, Paris (FR)

( * ) Notice: Subject to any disclaimer, the term of this patent is extended or adjusted under 35 U.S.C. 154(b) by 0 days.

(21) Appl. No.: 10/015,636

(22) Filed: Dec. 17, 2001

(65) Prior Publication Data

US 2002/0097133 A1 Jul. 25, 2002

(30) Foreign Application Priority Data

Dec. 27, 2000 (FR) .............................. 00 17113

(51) Int. Cl.[7] ........................ H01H 37/14; H01H 37/46
(52) U.S. Cl. ...................... 337/141; 337/139; 337/393; 60/528
(58) Field of Search ................. 337/12, 14, 16, 337/27, 139–141, 339, 343, 393, 298, 333, 362, 365; 251/129.01, 129.02; 60/527–529

(56) References Cited

U.S. PATENT DOCUMENTS

| 4,423,401 A | * | 12/1983 | Mueller ...................... 337/107 |
| 5,029,805 A | * | 7/1991 | Albarda et al. ................ 251/11 |
| 5,058,856 A | * | 10/1991 | Gordon et al. ................ 251/11 |
| 5,619,061 A | * | 4/1997 | Goldsmith et al. .......... 257/528 |
| 5,619,177 A | * | 4/1997 | Johnson et al. .............. 337/140 |
| 5,796,152 A | * | 8/1998 | Carr et al. .................... 257/415 |
| 6,239,685 B1 | * | 5/2001 | Albrecht et al. ............. 337/365 |
| 6,355,534 B1 | * | 3/2002 | Cheng et al. ................. 438/379 |
| 6,418,006 B1 | * | 7/2002 | Liu et al. ...................... 361/277 |
| 6,437,965 B1 | * | 8/2002 | Adkins et al. ............... 361/303 |
| 6,456,190 B1 | * | 9/2002 | Andersson et al. .......... 337/365 |
| 6,504,447 B1 | * | 1/2003 | Laney et al. ................ 333/17.2 |

FOREIGN PATENT DOCUMENTS

| DE | 38 09 597 | 10/1989 |
| EP | 1 098 121 | 5/2001 |
| FR | 2 766 962 | 2/1999 |
| FR | 2 772 512 | 6/1999 |

* cited by examiner

Primary Examiner—Anatoly Vortman
(74) Attorney, Agent, or Firm—Oblon, Spivak, McClelland, Maier & Neustadt, P.C.

(57) ABSTRACT

The invention relates to a microswitch containing conductors located on a first level and conductors located on a second level, where the conductors on the first level are supported by a deformable element which can switch by means of an actuator with a bimetallic effect, and where the effect of this switching is that the gap between the conductors on the first level and the conductors on the second level is modified, characterised in that the actuator with a bimetallic effect consists of resistors in close and localised contact with the deformable element, and in that the resistors are capable, when traversed by an electric control current, of expanding sufficiently under the effect of the heat produced by the passage of the electric command current to cause, by the bimetallic effect, the deformable element to trigger before the heat produced in the resistors has been able to propagate into the deformable element.

24 Claims, 4 Drawing Sheets

MICRO-DEVICE WITH THERMAL ACTUATOR

TECHNICAL FIELD

The present invention relates to a micro-device with an element which deforms under the effect of a thermal actuator. This micro-device may constitute a microswitch which is particularly well-suited to switching of radio frequency signals.

STATE OF PRIOR TECHNOLOGY

Microswitches are micro-devices which are increasingly used in modern electronic devices one of the major characteristics of which is their increasingly small size. This is the case, notably, with mobile telephones. The design of a microswitch for this type of equipment is confronted with the delicate problem of the on-board available power to activate the microswitches. Current microswitches must be able to be controlled using low voltages (3V for example) and over very short times.

The document "Micromechanical relay with electrostatic actuation and metallic contacts" by M. -A. GRETILLAT et al., Transducers '99, Jun. 7–10, 1999, Sendai, Japan, divulges an electrostatically-controlled microswitch requiring a control of around 20 V.

The document "Bulk micromachined relay with lateral contact" by Zhihong LI et al., published in J. Micromech. Microeng. 10 (2000), pages 329–333, divulges an electrostatically controlled relay using large facing areas. This causes a pneumatic dampening. The system is dampened and the switching times increase. Moreover, technical production of the active line's contact is very difficult and the large number of electrodes involved tends to cause disturbances in the control on the radio frequency signal conveyed by the active line.

Document FR-A-2 772 512 divulges a micro-system, usable notably to produce microswitches or micro-valves, constituted on a substrate and used to obtain triggering between a first operational state and a second operational state by means of a thermal actuator with bimetallic effect. The actuator comprises a deformable element attached, by opposite ends, to the substrate so as to present naturally a deflection without constraint compared to a surface of the substrate opposite it; this natural deflection determines the first operational state, and the second operational state is caused by the thermal actuator which, under the effect of a temperature variation, causes a deformation of the deformable element tending to reduce its deflection and subjecting it to a compression stress which causes triggering of it by a buckling effect in a direction opposite to its natural deflection. This device requires a relatively major thermal exchange to control it. When the control resistor is heated the member constituting the deformable element dissipates a large proportion of the heat produced (by radiation and conduction). This energy loss must be taken into account in calculating the energy to be applied for control of the bimetallic element. Moreover, the structure's trigger time is relatively long as a consequence of the time required for thermal conduction and also as a consequence of the losses by radiation with the environment which must be compensated during heating.

ACCOUNT OF THE INVENTION

To remedy the disadvantages mentioned above, a micro-device is proposed comprising conductors located on a first level and conductors located on a second level, where the conductors of the first level are supported by a deformable element which can trigger by means of an actuator with bimetallic effect; the effect of the triggering is to modify the gap between the conductors on the first level and the conductors on the second level, characterised in that the actuator with bimetallic effect consists of resistors in close and localised contact with the deformable element, and in that the resistors are able, when traversed by an electric control current, to expand sufficiently under the effect of the heat produced by the passage of the electric control current to cause, by a bimetallic effect, a triggering of the deformable element before the heat produced in the resistors has been able to propagate in the deformable element.

The deformable element is preferably a member or a membrane.

Electrostatic holders may be included to hold the deformable element in the position it has after it is triggered, when the control current is cancelled. The electrostatic holders may include at least one pair of electrodes facing one another, with one of these electrodes forming a single piece with the deformable element, and the other being located such that, when the deformable element has triggered, the gap between the facing electrodes is minimal.

In one variant embodiment, the electrostatic holders include at least one pair of facing electrodes, with one of these electrodes forming a single piece with the deformable element, and the other being located such that, when the deformable element has triggered, the electrodes are in contact with one another but separated by electrical insulators.

The resistors may include at least one layer deposited in the shape of a wave. This leads to improved efficiency for the actuator.

The resistors are preferably made from a material chosen from aluminium, manganese, zinc, gold, platinum, nickel or inconel 600.

If the micro-deposit is accomplished using micro-technology techniques, the deformable element may originate from a layer deposited on a substrate.

In a first embodiment, the conductors located on the second level include a first line contact and a second line contact, and the effect of triggering the deformable element is to reduce to zero the distance between the conductors on the first level and the conductors on the second level, with the first level conductors thus forming an electrical link between the first contact and the second contact, and the micro-device thus constituting a microswitch. The conductors supported by the deformable element are ideally constituted by a conductive block.

In a second embodiment, the first level conductors and the second level conductors respectively constitute a first electrode and a second electrode of a condenser, and where this condenser has a first capacity value before the triggering of the deformable element and a second capacity value after the triggering of the deformable element.

According to one variant embodiment, an insulating layer of high dielectric constant separates the first electrode and the second electrode of the condenser. This insulating layer, of thickness less than 0.1 $\mu$m for example, may be located on one of the two electrodes, or on both of them.

BRIEF DESCRIPTION OF DRAWINGS

The invention will be better understood and other advantages and features will appear on reading the description below, which is given as a non-limiting example, accompanied by the annexed drawings among which.

DETAILED DESCRIPTION OF EMBODIMENTS OF THE INVENTION

Figure 1:
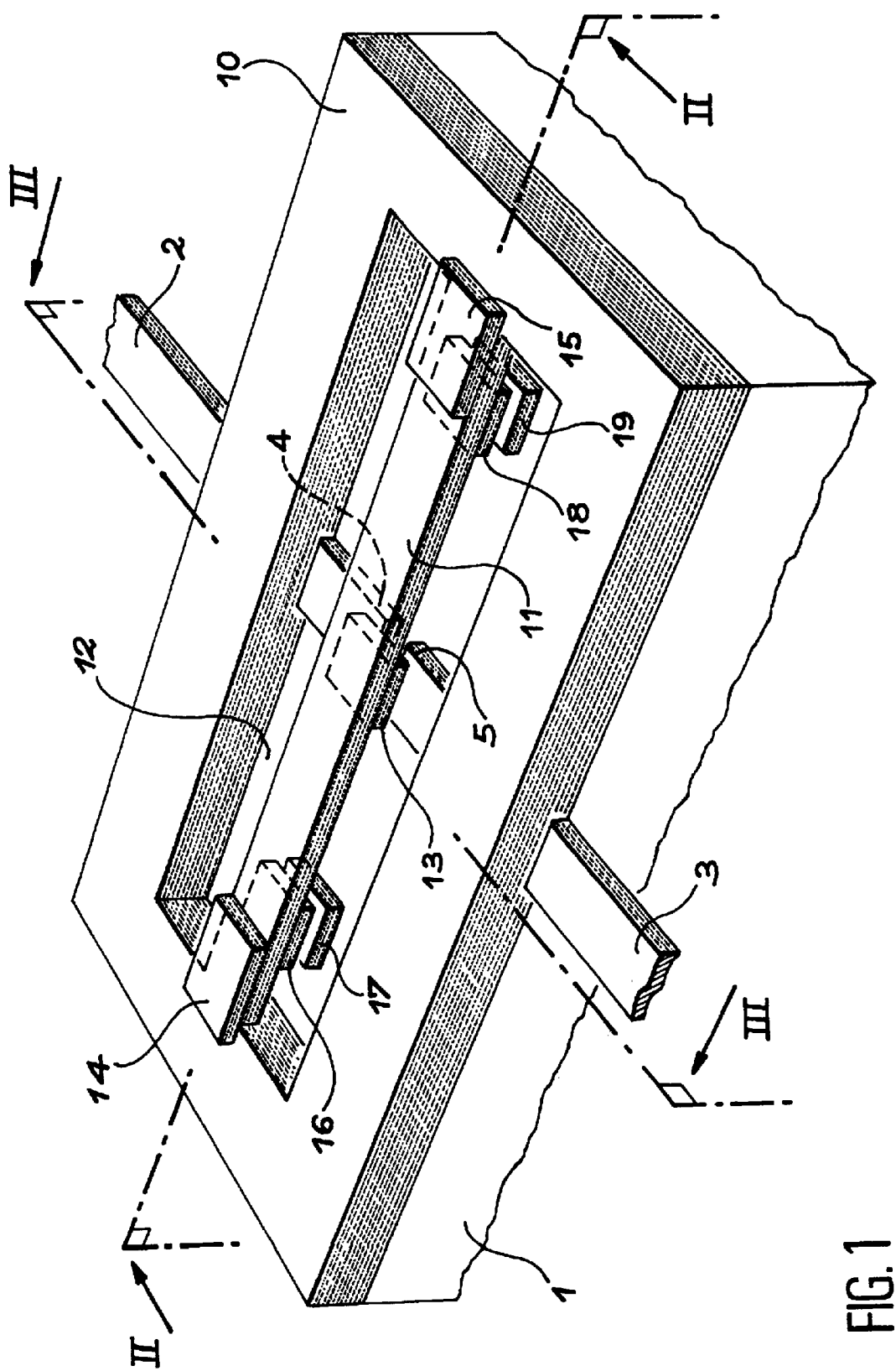
FIG. 1 is a schematic, perspective view of a microswitch according to the invention.
Figure 2:
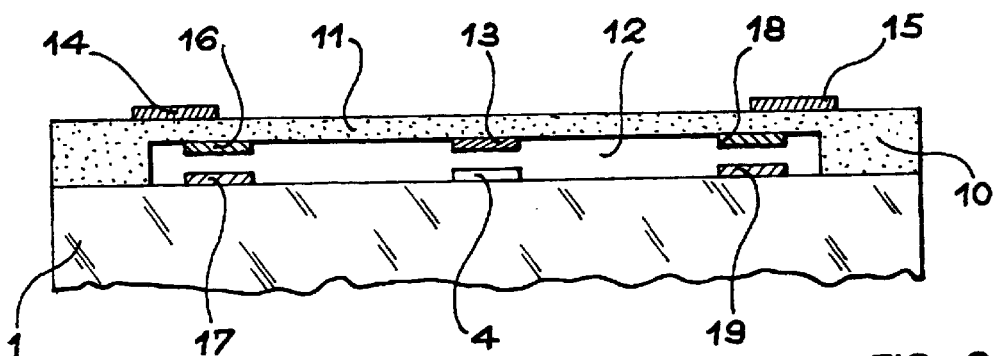
FIGS. 2 and 3 are views, respectively in longitudinal and transverse sections, of the microswitch represented in perspective in FIG. 1.
Figure 3:
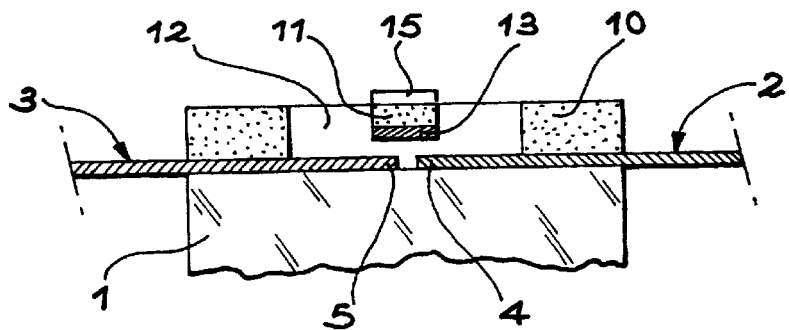

FIG. 1 (perspective view) and FIGS. 2 and 3 (section views) illustrate a microswitch according to the present invention.

This microswitch is produced on a substrate 1, for example made from silicon, silica, glass or quartz. Substrate 1 supports a first section of line 2 terminated by a contact 4 and a second section of line 3 terminated by a contact 5. Contacts 4 and 5 are simply separated by a small interval.

Substrate 1 supports one or more layers, made from an electrical insulating material, designated as single reference 10 and from which a deformable element has been produced in the form of member 11 (for example made from silicon nitrite or silicon oxide) able to be deformed in a cavity 12 of layer 10 revealing the substrate 1 and contacts 4 and 5. Member 11 has, on the side of cavity 12, a conductive block 13 able to form an electrical link between contacts 4 and 5 when member 11 deflects in cavity 12. This microswitch may be achieved by the process divulged in document FR-A-2 772 512 mentioned above.

The member (or membrane if applicable) may be formed through the stacking of layers of different expansion coefficients.

Member 11 supports two resistors 14 and 15 located towards the ends of the member. These resistors may be deposits of a conductive material, for example aluminium, manganese, zinc, gold, platinum, nickel or inconel 600. They are linked to current sources by unrepresented connection lines.

FIG. 2 shows electrostatically held electrodes arranged in pairs and facing one another: the pair of electrodes 16 and 17 firstly, and the pair of electrodes 18 and 19 secondly. Electrodes 16 and 18 are supported by member 11. They can also be included in the member. Electrodes 17 and 19 are placed at the bottom of cavity 12, on substrate 1. Unrepresented connection lines allow these electrodes to be linked to appropriate voltage sources.

FIGS. 2 and 3 show the microswitch at rest, with the actuator not activated. Conductive block 13 does not form the electrical link between contacts 4 and 5.

Figure 4:
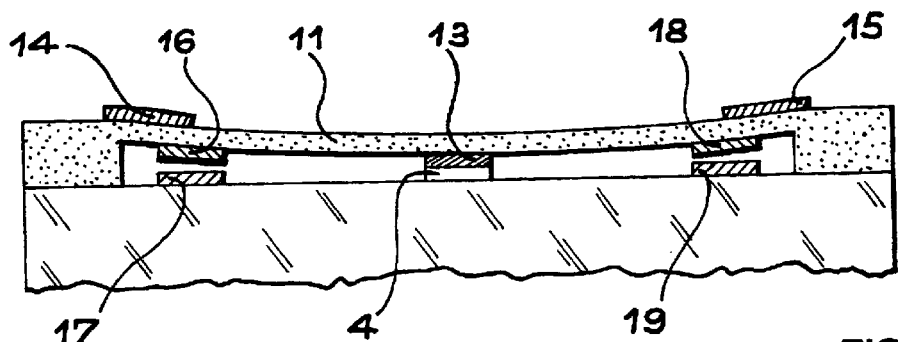
FIG. 4 is a view of the microswitch corresponding to FIG. 2 but where the thermal actuator has been activated.

When the actuator is activated by passing an electrical current through resistors 14 and 15, the resulting heat produced causes, by a bimetallic effect, the deflection of the member to the bottom of cavity 12. Conductive block 13 comes to rest on contacts 4 and 5 and causes an electrical link between line sections 2 and 3. This is what is shown in FIG. 4.

Figure 7:
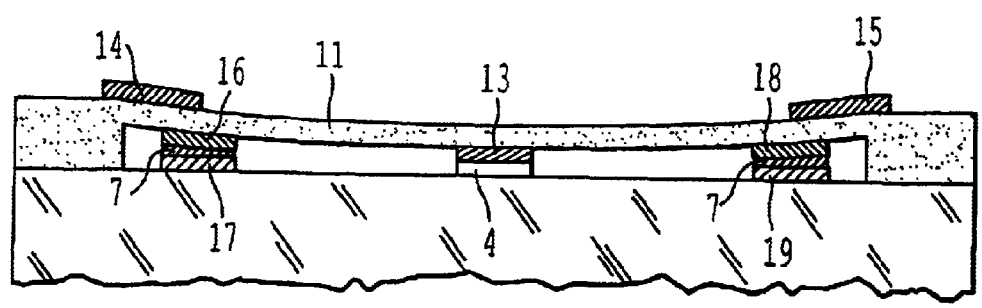
FIG. 7 is a view of the microswitch that illustrates the electrostatic holders separated by an electric insulator.

Electrodes 16 and 17 firstly, and 18 and 19 secondly, which are then at their minimum distance or in contact but separated by a thin insulating layer, or electric insulator 7 as illustrated in FIG. 7, hold the deflected member electrostatically by the application of appropriate voltages when the electrical current has stopped passing through resistors 14 and 15. The electrostatic holding voltages may be applied to electrodes 16, 17 and 18, 19 when the thermal actuator has already caused the member to deflect. They may also be applied before the member deflects so as to accelerate this deflection.

To open the microswitch, one need merely cancel the electrostatic holding voltages. The member then returns to its rest position, and this happens more rapidly if the parts heated by the resistors have had time to cool.

In order for the deflection of the member to occur as rapidly as possible, and for it to return to its rest position, the thermal actuator must have properties of the quasi-adiabatic type. To this end the bimetallic effect relative to the member and the resistor only applies to part of the member, but this is sufficient to cause it to trigger.

The time for the rise in temperature of elements 14 and 15 must be very short for application to switching of radio frequency signals, which are as a general rule less than 10 μs. They must thus be made of a material which heats very rapidly. The Young module and the thermal expansion factor must thus be considered. At the same time, its geometrical characteristics must be determined.

In practice a material is chosen which is likely to be suitable. The change in deflection of the member according to an applied temperature is examined. This change essentially has a sinusoid shape. The temperature enabling a contact to be obtained in the case of a switch (or the desired capacity in the case of a variable condenser) is determined. After this the two points of inflection of the sinusoid are determined. The particularly advantageous length for the resistor to be is that determined from the distance between the embedding point of the member and the inflection point.

The mechanical properties of the member are studied to determine its most appropriate thickness and then its most favourable geometry. The triggering temperature is then determined.

The flection control consists in heating only the resistors without heating the adjacent member or the environment of the resistors. For the return to the non-deflected position, the resistors must in principle return to the ambient temperature before the electrostatic holding is released.

Figure 5:
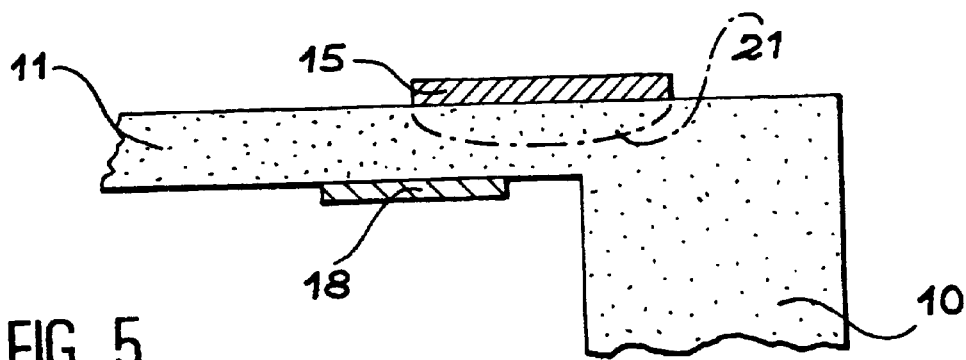
FIG. 5 is a detail view of the microswitch represented in FIGS. 1 to 4 showing an embodiment of the thermal actuator.

FIG. 5 shows an embodiment of the thermal actuator. This is a detailed view of one end of member 11. When an electrical current activating the actuator traverses resistor 15, the resulting heat expands the resistor and allows the member to be deflected.

Figure 6:
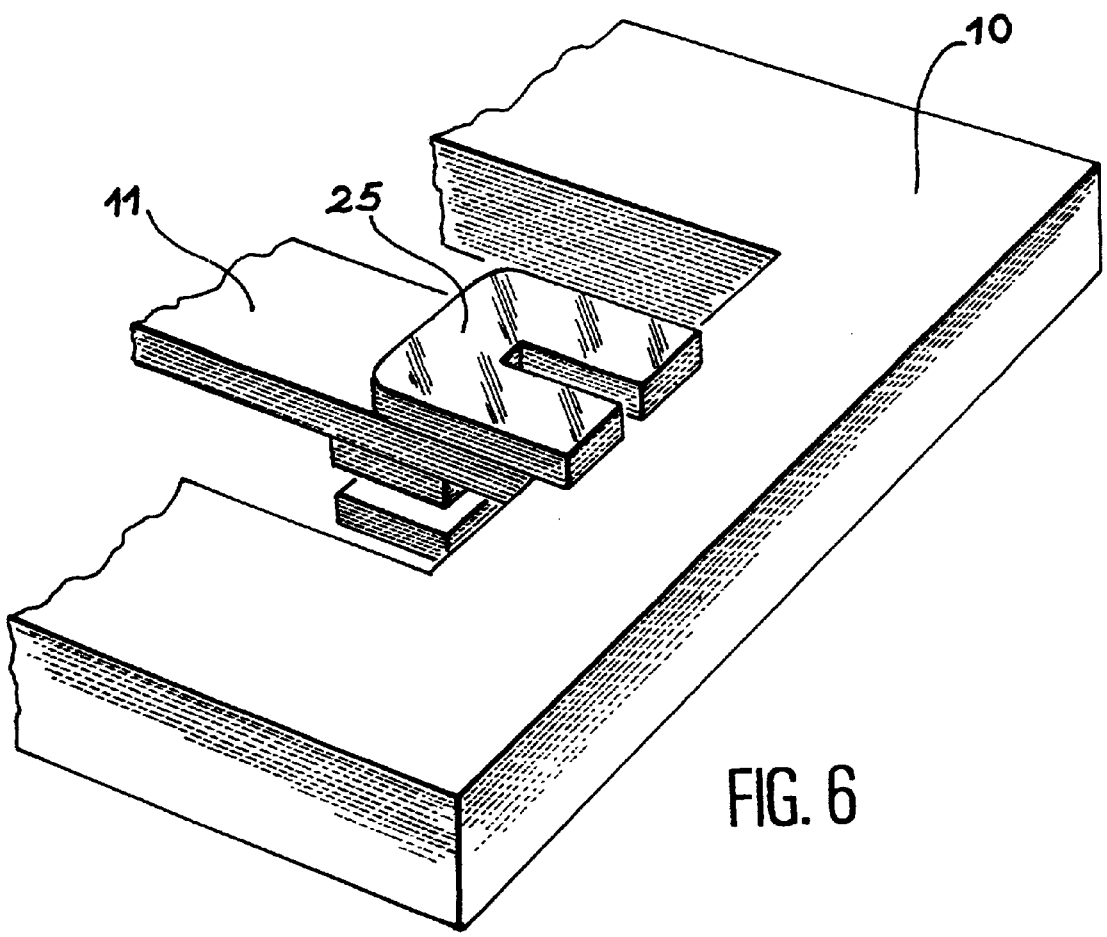
FIG. 6 is a view from above of a preferred resistor usable for the microswitch according to the invention.

FIG. 6 is a view from above of a resistor 25 usable by the present invention. This view shows that resistor 25 is in the shape of a wave. It has the advantage of improving the thermal actuator's efficiency.

Figure 8:
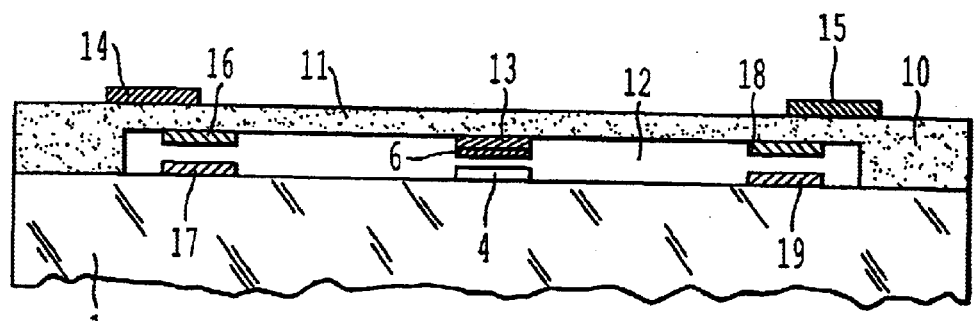
FIG. 8 is a view of the microswitch operating as a condenser comprising a conductive block and a contact, or electrodes, separated by an insulating layer.

Another feature of the present invention is the operation of the microswitch as a condenser. In this case, a first level conductor (conductive block 13) and a second level conductor (contact 4) constitute a first electrode and a second electrode of a condenser, wherein the condenser has a first capacity value before the triggering of the deformable element or member 11 (as illustrated) and a second capacity value after the triggering of the deformable element or member 11. A variant of this embodiment, as illustrated in FIG. 8, comprises an insulating layer 6 of high dielectric constant that separates the first and the second electrodes of the condenser. The insulating layer 6, of thickness less than 0.1 µm, for example, may be located on one of the two electrodes (as illustrated), or on both of them.

The microswitch according to the invention operates at an available voltage of 3 V. To use this voltage value optimally, it is preferable to have two resistors connected in series.

What is claimed is:

1. A micro device comprising:
   at least one contact;
   a deformable element being supported for a motion with respect to said at least one contact;
   a conductor provided at said deformable element, said conductor approaching said at least one contact upon deformation of said deformable element; and
   a quasi-adiabatic resistor means provided at said deformable element such that thermal expansion of said quasi-adiabatic resistor by application of an electric current triggers said deformation.

2. A micro device as in claim 1 wherein the deformable element is a member or membrane.

3. A micro device as claimed in any one of claims 2 or 1, further comprising electrostatic holders configured to hold the deformable element in the deformed position after the electric current is cancelled.

4. A micro device as in claim 3, wherein the electrostatic holders further comprise at least one pair of electrodes facing one another such that one of the electrodes forms a single piece with the deformable element, and the other is positioned such that the distance between the facing electrodes is minimal when the deformable element is triggered.

5. A micro device as in claim 3 wherein the first and second electrostatic holders further comprise at least one pair of facing electrodes such that one of the electrodes forms a single piece with the deformable element and the other electrodes are separated from each other by an electric insulator when said deformation is triggered.

6. A micro device as claimed in any one of claims 2 or 1, wherein the quasi-adiabatic resistor is composed of at least one layer deposited in the form of a wave.

7. A micro device as claimed in any one of claims 2 or 1, wherein the quasi-adiabatic resistor is made of one of aluminum, manganese, zinc, gold, platinum, nickel or inconel 600.

8. A micro device as claimed in any one of claims 2 or 1, wherein the deformable element is a layer deposited on a substrate.

9. A micro device as claimed in any one of claims 2 or 1, wherein said at least one contact comprises a first contact and a second contact and triggering the deformable element reduces to zero the distance between said first and second contacts.

10. A micro device as in claim 9, wherein the second contact provided at the deformable element is a conductive block.

11. A micro device as claimed in any one of claims 2 or 1, wherein the conductor and said at least one contact constitute, respectively, a first electrode and a second electrode of a variable condenser and the capacitance of the condenser changes when the deformable element is triggered.

12. A micro device as in claim 11, wherein an insulating layer of high dielectric constant separates the first electrode and the second electrode of the condenser.

13. A micro device comprising:
   a substrate having a surface with a first contact and a second contact;
   a deformable element being supported for a reciprocating motion with respect to said first and second contacts, said deformable element having a top surface, and a bottom surface facing said first and second contacts;
   a conductor located on said bottom surface and separated from and aligned with said first and second contacts, said conductor being configured to approach said first and second contacts upon a deformation of said deformable element; and
   a quasi-adiabatic resistor means disposed on said top surface at a location such that thermal expansion of said quasi-adiabatic resistor by application of an electric current triggers said deformation while the temperature of said deformable element remains substantially unchanged.

14. A micro device as in claim 13, wherein the deformable element is a member or membrane.

15. A micro device as in claim 13, further comprising electrostatic holders configured to hold the deformable element in the deformed position after the electric current is cancelled.

16. A micro device as in claim 15, wherein the electrostatic holders further comprise at least one pair of electrodes facing one another such that one of the electrodes forms a single piece with the deformable element and the other is positioned such that the distance between the facing electrodes is minimal when the deformable element is triggered.

17. A micro device as claimed in claim 15, wherein the first and second electrostatic holders further comprise at least one pair of facing electrodes such that one of the electrodes forms a single piece with the deformable element and the other electrode are separated from each other by an electric insulator when said deformation is triggered.

18. A micro device as in claim 13, wherein the quasi-adiabatic resistor is composed of at least one layer deposited in the form of a wave.

19. A micro device as in claim 13, wherein the quasi-adiabatic resistor is made of one of aluminum, manganese, zinc, gold, platinum, nickel or inconel 600.

20. A micro device as in claim 13, wherein the deformable element is a layer deposited on said substrate.

21. A micro device as claimed in claim 13, wherein triggering the deformable element reduces to zero the distance between the conductor and said first and second contacts.

22. A micro device as in claim 21, wherein the conductor is a conductive block.

23. A micro device as claimed in claim 13, wherein the conductor is a first electrode of a variable condenser and the first and second contacts are a second electrode of the variable condenser, respectively, and the capacitance of the condenser changes when the deformable element is triggered.

24. A micro device as in claim 23, wherein an insulating layer of high dielectric constant separates the first electrode and the second electrode of the condenser.

* * * * *